United States Patent
Elnathan (10) Patent No.: US 7,072,342 B1
(45) Date of Patent: Jul. 4, 2006

(54) REORDERING OF OUT-OF-ORDER PACKETS

(75) Inventor: Nathan Elnathan, Ranana (IL)

(73) Assignee: Applied Micro Circuits Corporation, San Diego, CA (US)

( * ) Notice: Subject to any disclaimer, the term of this patent is extended or adjusted under 35 U.S.C. 154(b) by 939 days.

(21) Appl. No.: 10/103,393

(22) Filed: Mar. 20, 2002

(51) Int. Cl.
*H04L 12/28* (2006.01)

(52) U.S. Cl. .................... 370/394; 370/412

(58) Field of Classification Search ........... 370/386, 370/389, 392, 394, 396, 412, 413, 415, 417
See application file for complete search history.

(56) References Cited

U.S. PATENT DOCUMENTS

| | | | |
|---|---|---|---|
| 5,914,954 A * | 6/1999 | Nakayama ................. | 370/394 |
| 6,246,684 B1 | 6/2001 | Chapman et al. | |
| 6,389,016 B1 * | 5/2002 | Sabaa et al. ............... | 370/389 |
| 6,731,652 B1 | 5/2004 | Ramfelt et al. | |
| 6,778,548 B1 * | 8/2004 | Burton et al. ............... | 370/429 |
| 6,853,641 B1 * | 2/2005 | Lindhorst-Ko et al. ..... | 370/394 |
| 6,862,282 B1 * | 3/2005 | Oden ......................... | 370/394 |
| 6,947,425 B1 * | 9/2005 | Hooper et al. .............. | 370/394 |
| 6,982,975 B1 * | 1/2006 | Aramaki et al. ............. | 370/388 |
| 2003/0012200 A1 * | 1/2003 | Salamat ....................... | 370/394 |
| 2005/0141503 A1 * | 6/2005 | Welfeld ....................... | 370/392 |

OTHER PUBLICATIONS

U.S. Appl. No.: 0/103,436, filed on Mar. 20, 2002, entitled "Dynamic Allocation of Packets to Tasks," inventor: Nathan Elnathan, pp. 1-21 and 12 Sheets of drawings.

* cited by examiner

*Primary Examiner*—Phirin Sam
(74) *Attorney, Agent, or Firm*—Michael Shenker; MacPherson Kwok Chen & Heid LLP (57) ABSTRACT

Tasks are assigned to process packets, but the tasks may not process the packets in the order in which the packets were received. Thus, the order of the packets may be lost during processing. The packets, however, should still be transferred in the order in which the packets were received. Therefore, reordering is performed. In particular, the reordering is performed by having tasks write commands for packets into command buffers of a command queue based on a packet sequence number of a packet matching a current sequence number associated with the buffer and by reading commands for consecutive packets in order by passing from one command buffer to another command buffer. With the command buffers in the command queue being written and read in this manner, the packets are "reordered" so that they are transferred in the order in which they were received.

24 Claims, 8 Drawing Sheets

REORDERING OF OUT-OF-ORDER PACKETS

CROSS REFERENCE TO RELATED APPLICATIONS

This document is related to and incorporates by reference herein in its entirety the following U.S. patent application: Application Ser. No. 10/103,436, entitled "Dynamic Allocation of Packets to Tasks," by Nathan Elnathan et al., filed Mar. 20, 2002.

CROSS REFERENCE TO ATTACHED APPENDIX

Appendix A contains the following files in one CD-ROM (of which two identical copies are attached hereto), and is a part of the present disclosure and is incorporated by reference herein in its entirety:

Volume in drive D is 020320_1111

Volume Serial Number is BAAC-610A

Directory of D:\

| | | | |
|---|---|---|---|
| 03/20/02 | 11:14a | <DIR> | . |
| 03/20/02 | 11:14a | <DIR> | .. |
| 03/20/02 | 11:13a | | 58,707 ch_bank_12fe.v |
| 03/20/02 | 11:13a | | 55,668 ch_bank_1ge.v |
| 03/20/02 | 11:13a | | 23,223 ch_cmd.v |
| 03/20/02 | 11:13a | | 48,120 imau_ab_calc.v |
| 03/20/02 | 11:13a | | 7,758 lsu_cfifo.v |
| 03/20/02 | 11:14a | | 295,309 out_control.v |
| | 8 File(s) | | 488,785 bytes |
| Total Files Listed: | | | |
| | 8 File(s) | | 488,785 bytes |
| | | | 0 bytes free |

The files of Appendix A form source code of computer programs and related data of an illustrative embodiment of the present invention.

A ch_cmd.v file describes a translation table update upon request, which holds per task a lane and packet sequence number and describes the checking of a buffer's current sequence number against the task's packet sequence number, which sends the task to suspend if the numbers do not match.

A lsu_cfifo.v file describes a request FIFO issuing a lane, packet sequence number which goes to the translation table A ch_bank_1ge.v file and a ch_bank_12fe.v file describe the structure of the channel command buffers and instantiation of the Out Control, which issues the channel commands in order.

An out_control.v file does the issuing of channel commands in order.

An imau_ab_calc.v file describes the mechanism of updating the ch_cmd by the new current sequence number, upon close.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

A micro controller is a processor on a microchip that performs, for example, arithmetic and logic operations. A micro controller creates a task to perform a set of instructions. For example, a task may perform processing on a packet, which is a unit of data.

Packets are received and stored in memory in the order in which they were received in, for example, a First In First Out (FIFO) queue. One task is assigned to one packet and performs processing on the packet. During processing, the task generates commands that describe how the packet is to be transferred across a network. The task may write the commands into a FIFO queue in memory. Two tasks may share a single FIFO queue. At any given time, one task writes commands associated with a packet into the next available memory location in the queue. Because the tasks work on the packets in the order in which they were received and alternate when they will write into the FIFO queue, the result is that the commands for the packets are stored in the FIFO queue in the order in which the packets were received. Thus, the packets are transmitted in the order in which they were received.

Unfortunately, this technique requires that only two tasks work with a single FIFO queue. In a multi-tasking environment in which there are more than two tasks, multiple FIFO queues are used, with two tasks dedicated to each FIFO queue. This may result in a large number of FIFO queues, with associated overhead in maintaining the FIFO queues.

SUMMARY

In accordance with some embodiments of the invention, tasks are assigned to process packets, but the tasks may not process the packets in the order in which the packets were received. Thus, the order of the packets may be lost during processing. The packets, however, should still be transferred in the order in which the packets were received. Therefore reordering is performed. The reordering is performed by having tasks write commands for packets into command buffers of a command queue based on a packet sequence number of a packet matching a current sequence number associated with the buffer and by reading commands for consecutive packets in order by passing from one command buffer to another command buffer. With the command buffers in the command queue being written and read in this manner, the packets are "reordered" so that they are transferred in the order in which they were received.

BRIEF DESCRIPTION OF THE DRAWINGS

FIG. 6A illustrates, in a block diagram, a 12 fast Ethernet command, while

Use of the same reference symbols in different figures indicates similar or identical items.

DETAILED DESCRIPTION

In accordance with some embodiments of the invention, tasks are assigned to process packets, but the tasks may not process the packets in the order in which the packets were received. Thus, the order of the packets may be lost during processing. The packets, however, should still be transferred in the order in which the packets were received. Therefore reordering is performed. The reordering is performed by having tasks write commands for packets into command buffers of a command queue based on a packet sequence number of a packet matching a current sequence number associated with the buffer and by reading commands for consecutive packets in order by passing from one command buffer to another command buffer. The term "packet sequence number" refers to a number that is sequentially increasing (or decreasing in some embodiments) to indicate the order in which packets are received at a port. The term "current sequence number" refers to a number that is sequentially increasing (or decreasing in some embodiments) and is associated with a command buffer. With the command buffers in the command queue being written and read in this manner, the packets are "reordered" so that they are transferred in the order in which they were received.

Thus, in some embodiments of the invention, a micro controller processes packets out of order and writes commands to command buffers. The commands in the command buffers are read for consecutive packets (e.g., packets having consecutive packet sequence numbers) in the order in which the packets were received, and the packets are transferred in order (e.g., in the order of their packet sequence numbers).

In some embodiments of the invention, a command buffer is shared by multiple packets based on a modulo operation, while in some embodiments, the command buffer is not shared. Additionally, in some embodiments, a command buffer is logically related to a packet.

In some embodiments, each command buffer has an associated current sequence number register that holds a current sequence number. A task may write commands into a command buffer for a packet whose packet sequence number matches the current sequence number of the command buffer. Thus only one task at a time may write into a particular command buffer.

For example, Task3 may be assigned Packet5 with packet sequence number 5, and Task7 may be assigned Packet8 with packet sequence number 5+K (where K represents the total number of command buffers). If a command buffer's current sequence number is 5, and Task3 attempts to write commands for Packet5 into the command buffer, Task3 will be allowed to write into the command buffer. If the command buffer's current sequence number is 5, and Task7 attempts to write commands for Packet8 into the command buffer, the write will be rejected. Task7 will have to wait until the command buffer's current sequence number is 5+K before it can write commands for Packet8 into the command buffer.

In some embodiments, the command queue is a FIFO queue divided into multiple lanes, each having one or more command buffers. In particular, as packets are received from a port, they are assigned a lane and a packet sequence number. The term "lane" is used herein to identify a port and its direction (e.g., ingress or egress), such as Port 3 Egress. In some embodiments, a "lane number" is used for the identification. For example, Port 3 Egress may be referred to as lane 3e.

The command buffer into which commands are to be written is identified using the lane and packet sequence number. The lane identifies a lane in the command queue. The command buffer is identified using a modulo operation on the packet sequence number. In particular, if each port buffer has two command buffers, the packet sequence number modulo two determines which one of the two command buffers the task should write commands into for the packet.

Figure 1:
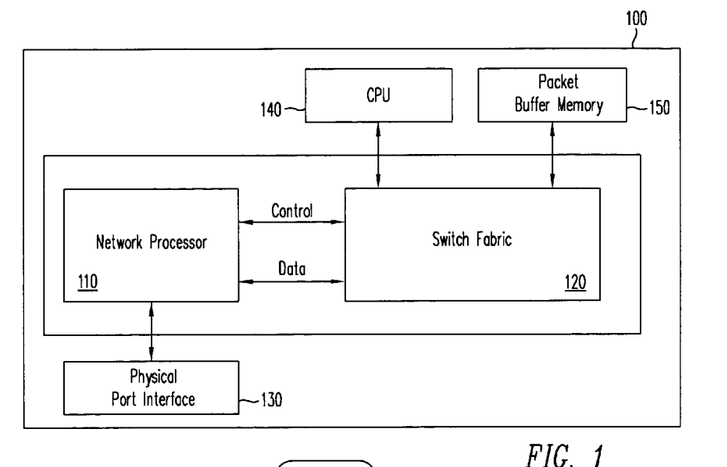
FIG. 1 illustrates, in a block diagram, an architecture in accordance with some embodiments of the invention.

FIG. 1 illustrates, in a block diagram, an architecture 100 in accordance with some embodiments of the invention. The architecture 100 includes a network processor 110 connected to a switch fabric 120. The network processor 110 contains one or more micro controllers (also referred to as "nPcores") and performs various transformations on the packet data as it enters or leaves the switch fabric 120. The switch fabric 120 refers to a combination of hardware and software that moves data coming in to the network processor 110 and out by the correct port. The switch fabric 120 includes switching units, integrated circuits that they contain, and the programming that allows switching paths to be controlled. The switch fabric 120 also manages an external packet buffer memory 150, in which packet data resides while it is within the switch fabric 120.

The overall process by which packets move from the physical port interface 130 to the packet buffer memory 150 is referred to as "ingress." The overall process by which packets move from the packet buffer memory 150 to the physical port interface 130 is referred to as "egress." The physical port interface 130 includes media access controllers.

The CPU interface 140 is connected to the switch fabric 120. The CPU interface 140 supports switch management functions, such as initialization and connection set up when a computer is started. The CPU interface 140 also enables micro controller program download to the network processor 110 during a boot process (when the computer is started or rebooted). During operation of the computer, after the boot process has completed, the CPU interface 140 also allows applets to be downloaded to the network processor 110. Control commands and data packets are routed between the network processor 10 and the switch fabric 120.

Figure 2:
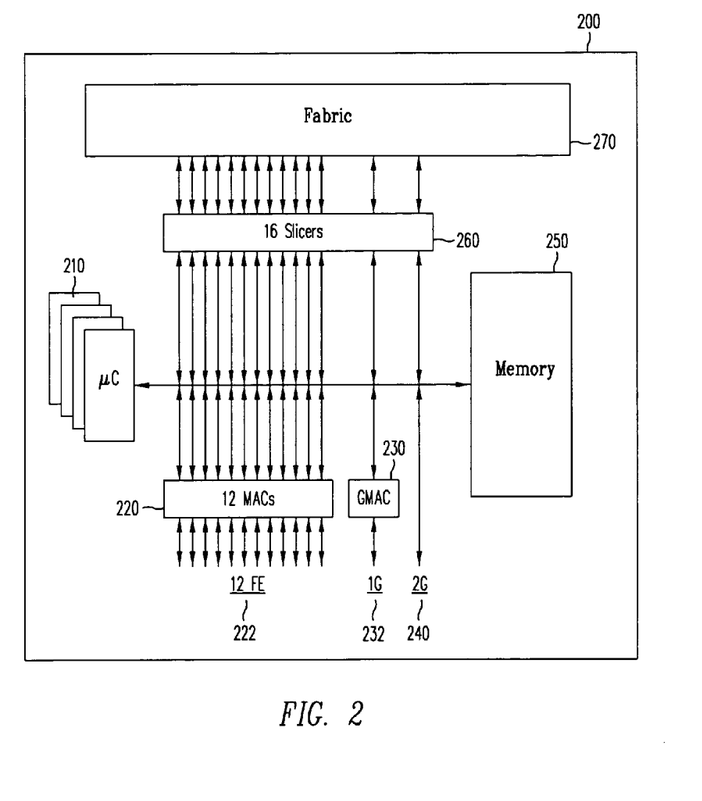
FIG. 2 illustrates, in a block diagram, an internal structure of a port interface in accordance with some embodiments of the invention.

FIG. 2 illustrates, in a block diagram, an internal structure of a port interface in accordance with some embodiments of the invention. The port interface includes micro controllers that are in the network processor 110, a switch fabric 120, and details of the physical port interface 130. A port is a location on a computer at which other devices (e.g., a printer or a facsimile machine) may be connected to the computer.

Circuit 200 of FIG. 2 includes micro controllers 210 (labeled "µC"). Each micro controller 210 is a special purpose central processing unit. The micro controllers 210 execute programs to control the operation of all of the internal blocks in memory 200. In particular, the micro controllers 210 generate tasks to execute instructions.

The circuit also includes 12 media access controllers 220 that are used to connect to 12 fast Ethernet ports 222, a gigabit media access controller 230 that is used to connect to one gigabit Ethernet port 232, and a two gigabit stack port 240. The micro controllers 210 service all ports based on assignment of micro controllers to ports. In particular, as a packet is received from a port, the packet is stored in a First In First Out queue (FIFO) queue. As tasks become available, they are assigned to process packets from the ports. As each task is associated with a micro controller 210, assignment of tasks to packets also assigns micro controllers 210 to those packets, and thus to the ports from which the packets arrived. The circuit 200 also includes a memory 250, which may store, for example, FIFO queues and registers.

The circuit 200 includes 16 slicers 260. The slicers 260 are used to send data to and from the fabric 270. The slicers 260 include an ingress portion and an egress portion. The ingress portion divides packets (also referred to as "frames") that are received from ports into cells, attaches an appropriate tag to each cell to identify the packet with which the cell is associated, and forwards the cells to the fabric 270. The egress portion combines cells received from the fabric 270 to form an Ethernet frame (i.e. one type of frame).

The command FIFO may be stored in memory 250. The micro controller writes to the command FIFO, and the slicers and MACs read from the command FIFO. The micro controller may write to as many as, for example, 43 command buffers in one command FIFO. Since there is a command FIFO for ingress and a command FIFO for egress, the micro controller may write to as many as 86 command buffers. Each command buffer may hold, for example, seven to sixteen commands per packet.

Figure 3:
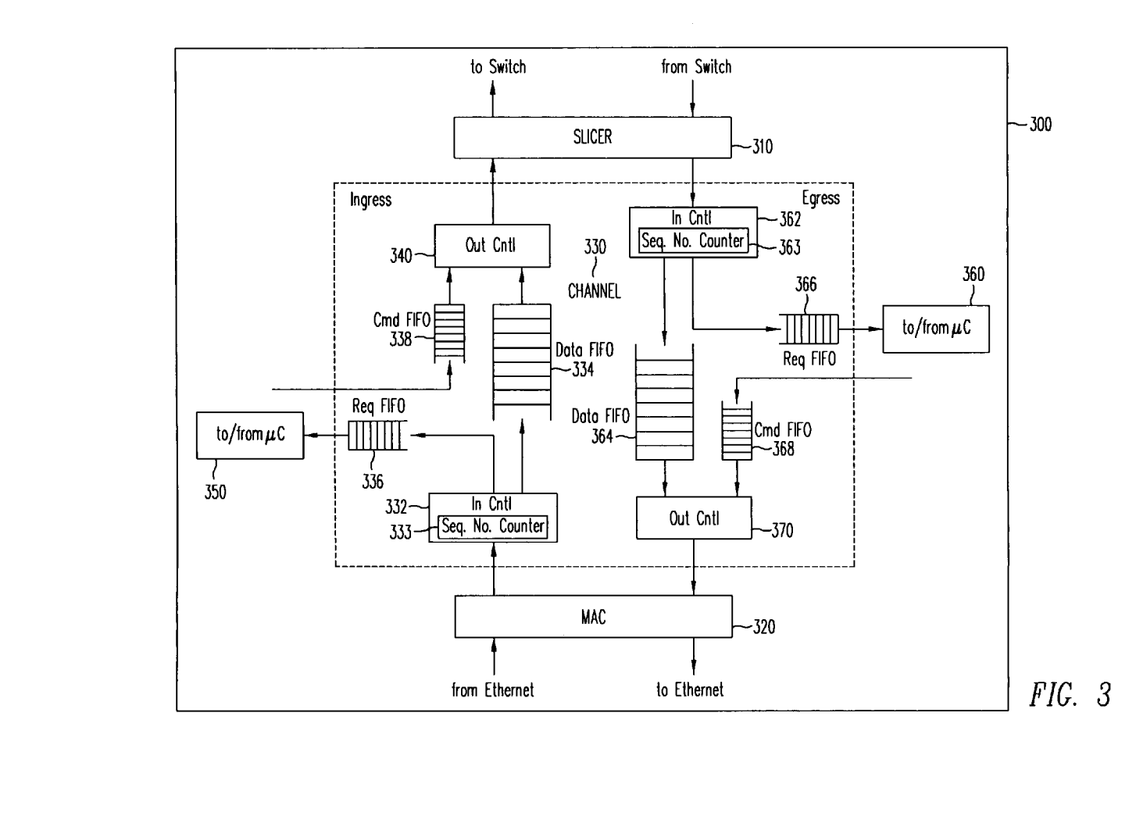
FIG. 3 illustrates, in a block diagram, a logical model of a port in accordance with some embodiments of the invention.

FIG. 3 illustrates, in a block diagram, a logical model of a port 300 in accordance with some embodiments of the invention. The logical model of the port 300 includes a slicer 310, which receives packets from a switch and sends packets to a switch. A media access control (MAC) 320 serves as an interface to and from an Ethernet. A channel 330 offers a bidirectional data path from the switch fabric to the MAC. In particular, the channel 330 consists of two unidirectional data paths, one for ingress and one for egress. The term "lane" will be used herein to indicate either the ingress or egress data path of a channel.

For ingress, a packet (e.g., an Ethernet frame) arrives from the Ethernet to the MAC 320. The packet is transferred to the input control 332, which stores the packet into a data FIFO 334. The input control 332 includes a sequence number counter 333, which is used to generate a packet sequence number to be assigned to the packet. In some embodiments, the sequence number counter 333 is a register that holds a sequence number (initialized to zeros) which is assigned to a packet and incremented before the next packet is assigned a sequence number. The input control 332 also writes a request into a request FIFO 336 to notify a micro controller 350 to process the packet of data. The request FIFO 336 includes one entry for each packet that is received. The micro controller 350 reads the request FIFO 336 and reads the header of a packet in the data FIFO 334. The micro controller 350 creates a task to process the packet, and the task stores commands that describe how the packet is to be transferred into a command FIFO 338.

The output control 340 reads and executes commands from the command FIFO 338 that were issued by tasks of the micro controller 350. Several commands may be related to the same packet. By executing these commands, the output control 340 transfers data inside the command to the slicer 310 and transfers data from the data FIFO 334 to the slicer 310. The slicer 310 forwards the packet to the switch.

The micro controller 350 interfaces with the channel 330 through the request FIFO 336 and command FIFO 338. When data is written into the request FIFO 336, the micro controller 350 is sent an indication that there is a new request pending. The command FIFO 338 is divided into several portions, allowing several tasks to write to the command FIFO 338 simultaneously. When the command FIFO 338 is full, the channel 330 sends an indication to the micro controller 350 to prevent the micro controller 350 from writing another command. The micro controller 350 also has direct access to the data FIFO 334, where packets are stored.

For egress, a packet arrives from the switch to the slicer 310. The packet is transferred to the input control 362, which stores the packet into a data FIFO 364. The input control 362 also includes a sequence number counter 363, which is used to assign sequence numbers to packets. The input control 362 also writes a request into a request FIFO 366 to notify a micro controller 360 to process the packet of data. The request FIFO 366 includes one entry for each packet that is received. The micro controller 360 reads the request FIFO 366 and reads the header of a packet in the data FIFO 364. The micro controller 360 and creates a task to process the packet, and the task stores commands that describe how the packet is to be transferred into a command FIFO 368. The output control 370 reads and executes commands from the command FIFO 338 that were issued by tasks of the micro controller 360. Several commands may be related to the same packet. By executing these commands, the output control 370 transfers data inside the command to the MAC 320 and transfers a packet from the data FIFO 364 to the MAC 320. The MAC 320 forwards the packet to the Ethernet.

Figure 4:
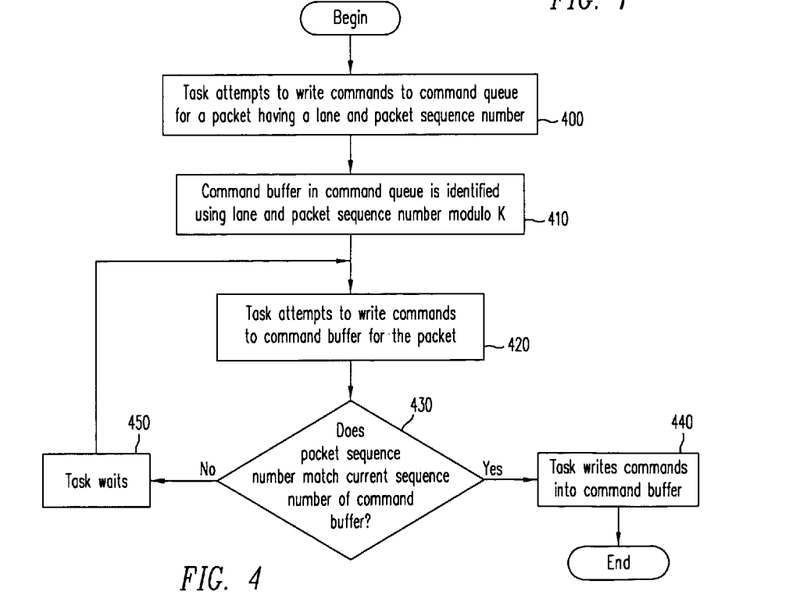
FIG. 4 illustrates, in a flow chart, acts performed by a task of a micro controller programmed in accordance with some embodiments of the invention to perform packet processing.

FIG. 4 illustrates, in a flow chart, acts performed by a task of a micro controller programmed in accordance with some embodiments of the invention to perform packet processing. Act 400 represents the task attempting to write commands to a command queue for a task having a lane and a packet sequence number. Act 410 represents a command buffer in the command queue being identified using the lane and packet sequence number modulo K (where K is the total number of command buffers in a lane). Act 420 represents the task attempting to write into the identified command buffer for the packet. Act 430 represents the command buffer determining whether the packet sequence number matches the current sequence number associated with the command buffer. If there is a match, processing continues to act 420, otherwise, processing continues to act 430. Act 420 represents the task writing commands into the command buffer. Act 430 represents the task waiting for a period of time and looping back to act 400 to attempt to write commands to the command buffer at a later time.

Figure 5:
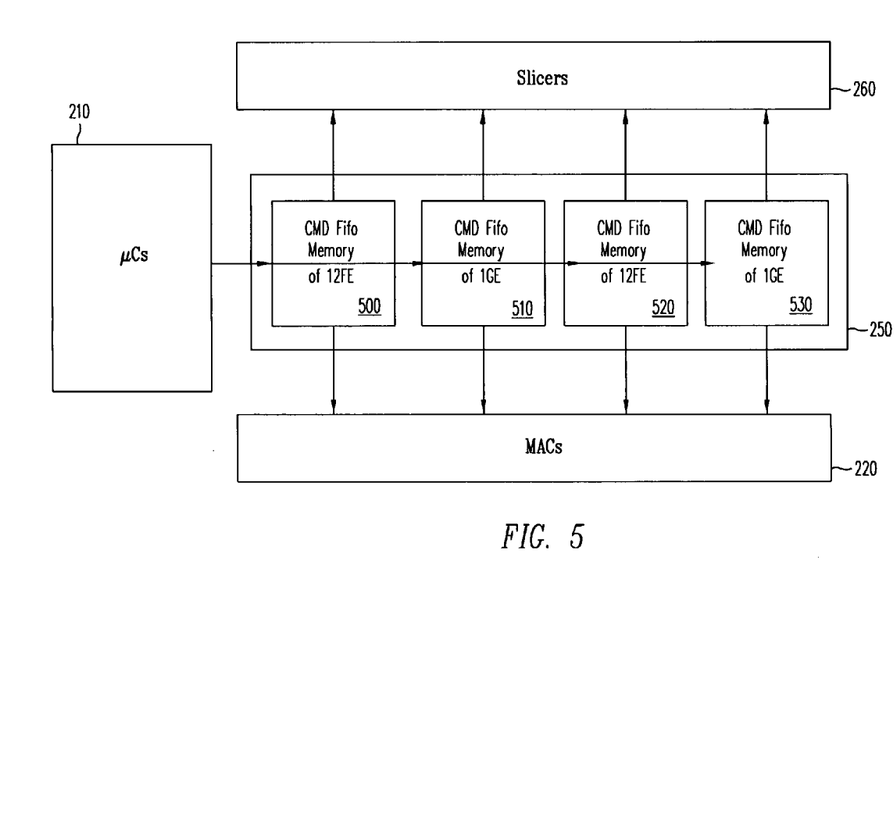
FIG. 5 illustrates, in a block diagram, a set of four command FIFOs that may be used in accordance with some embodiments of the invention.

In some embodiments, a different command FIFO is used for each of the ports. FIG. 5 illustrates, in a block diagram, a set of four command FIFOs that may be used in accordance with some embodiments of the invention. In particular, the four command FIFOs include: two 12-fast Ethernet (labeled "2FE") FIFOs 500 and 520 and two 1-gigabit Ethernet (labeled "1GE") FIFOs 510 and 530. A command FIFO is used to serve packets from packet sequence numbers that have relations of modulo K, where K represents the number of command buffers in a lane. For example, for a fast Ethernet port, the modulo is 2; for a gigabit Ethernet port, the modulo is 8; for a 2.5 gigabit Ethernet port, the modulo is 32. In some embodiments, the modulo may be 256, with only 256 packet sequence numbers used, and so each command FIFO is used per sequence number, without any sharing.

The micro controllers run parallel tasks that could process packets belonging to the same port. Each micro controller task could terminate its processing at different times. Therefore, tasks may not write commands for packets in the order in which the packets were received. Some embodiments of the invention, however, allows tasks to write commands into a command queue for a packet in a manner that allows the packets to be transferred in the order in which they were received, regardless of when the packet processing was completed for any particular packet. Because tasks write commands for packets into the command queue in order (based on a packet sequence number matching a command buffer's current sequence number), the reading of the command queue results in the commands being read in the correct order. In particular, the out control 340 or 370 reads commands from the command FIFO and transfers packets in the same order as the packets arrived. When the out control 340 or 370 reads a "close" command in the command buffer, the out control 340 or 370 moves to the next command buffer.

Figure 6A:
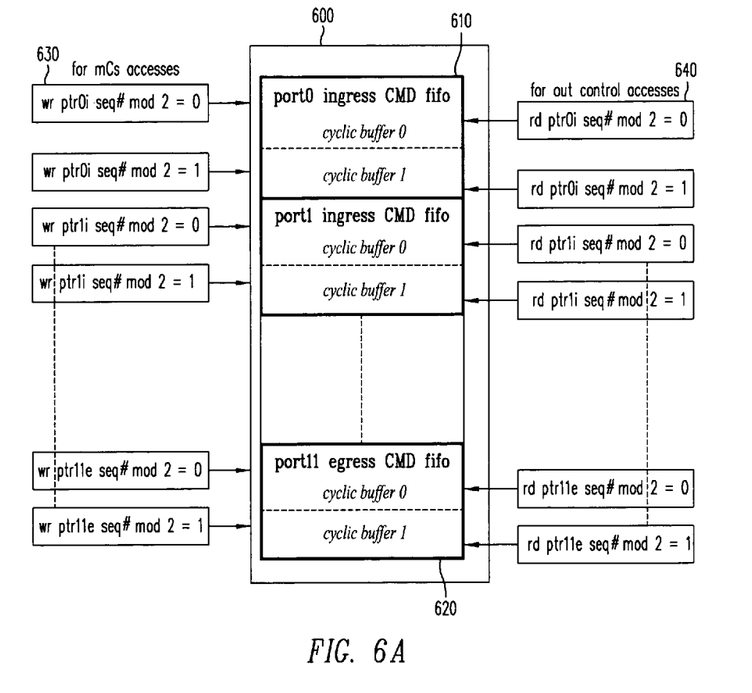

FIG. 6A illustrates, in a block diagram, a 12 fast Ethernet command FIFO 600 in accordance with some embodiments of the invention. The 12FE command FIFO 600 is separated into port buffers 0–11 (for 12 ports). Since there is a command FIFO for ingress and one for egress, the command FIFO is separated into 24 port buffers, with some of the port buffers designated as ingress and some designated as egress. For example, port buffer 610 is designated as ingress, while port buffer 620 is designated as egress. Each port buffer is divided into 2 command buffers. For example, port buffer 610 is divided into command buffer 0 (labeled "cyclic buffer 0") and command buffer 1 (labeled "cyclic buffer 1"). Thus, two micro controller tasks of consecutive packets may write to the port buffer simultaneously.

In some embodiments, one command FIFO may have a 64 bit port buffer @100 megahertz (Mhz), with 672 writes occurring in 672 clock cycles. Using this implementation allows enough bandwidth (i.e., 7*86=602<672 clock cycles), but may stall a micro controller when several micro controllers attempt to access a command buffer at the same time. Therefore, in some embodiments, the bandwidth is tripled by dividing a single port buffer into three port buffers.

The command FIFO holds write pointers and read pointers for each command buffer. The command FIFO identifies which pointer to use according to the current sequence number and the packet's sequence number.

For example, suppose several micro controllers attempt to write commands belonging to the same port. All micro controllers may attempt to write commands at about the same time. Each command that is written to the command FIFO has its own current sequence number and lane. The current sequence number is used by the command FIFO to determine which task may write commands into a particular command buffer (of a particular port buffer) at a given time.

Figure 6B:
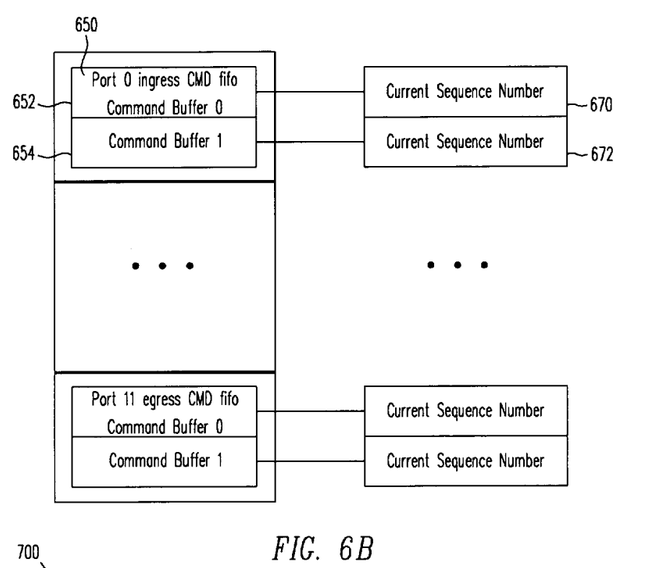
FIG. 6B illustrates, in a block diagram, current sequence number registers associated with command buffers in the 12 fast Ethernet command FIFO, FIFO in accordance with some embodiments of the invention.

FIG. 6B illustrates, in a block diagram, current sequence number registers in accordance with some embodiments of the invention. Each command buffer has an associated current sequence number register. For example, command buffer 652 in port buffer 650 has associated current sequence number register 670, and command buffer 654 has associated current sequence number register 672. The lines drawn from command buffers to current sequence number registers are used merely for purposes of illustration to represent the association. Each current sequence number register holds a current sequence number for its associated command buffer. A task is allowed to write commands into a command buffer if the packet sequence number of the packet the task is processing matches the current sequence number register associated with the command buffer. When a task completes processing a packet, the task writes a "close" command into the appropriate command buffer. Upon reading the close command of in a command buffer, the out control increments the current sequence number associated with the command buffer. Then a task processing a packet whose packet sequence number matches the command buffers' new, incremented current sequence number may write commands into the command buffer. When the command buffer is shared and the task writes a "close" command, a message is broadcast to indicate that this command buffer is available (e.g., may be written into).

Since many instructions in the micro controller may prepare commands for the command buffer, some embodiments of the invention allow tasks to write to the command FIFO while minimizing the number of tasks that are suspended and while maintaining the order of the packet commands in the command FIFO.

Therefore, once a command buffer is fully written by a task, and read by the out control, the command buffer is freed, and a task processing another packet is allowed to write to the command FIFO (i.e., to the same command buffer that was freed). The command buffer will be written again by a task belonging to a packet, with the same packet sequence number modulo K (where K represents the number of command buffers per port buffer and, in this example, is 2), as the packet which has previously written to the same command buffer. Each command buffer is written cyclically.

In some embodiments, each lane has K command buffers (wherein M=0, . . . ,K−1) that hold commands, written by a task processing a packet. Each packet has a packet sequence number, which is used to redirect the writes of commands to command buffer M if: packet sequence number modulo K=M.

The writes to each command buffer are done in order, by allowing only one task to write commands for its packet to a command buffer based on a packet sequence number matching a current sequence number associated with the command buffer. The task performs the write using a write pointer, such as 630.

If a packet with packet sequence number J is writing to command buffer M, then the synchronization will be between writes of packet sequence number J, J+K, J+2K, . . . That is, a task processing packet sequence number J will complete writing commands to command buffer M, then a task processing packet sequence number J+K will write commands to command buffer M. A task processing packet sequence number J+1 writes commands into command buffer M+1, etc. Packet J+K is not allowed to write before the task processing a packet with packet sequence number J has completed writing all its commands.

K tasks, each processing packets with K packet sequence numbers, may write commands into each of the K command buffers simultaneously, since they are writing to different command buffers. This results in the write process being very efficient.

The out control reads (using read pointers, such as 640) once from the first command buffer, from the second command buffer, etc. for each of the K command buffers for each port buffer, and then cycles back to the first command buffer, and continues to loop through the K command buffers. That is, a single packet is read from command buffer 0, then 1, . . . , then K−1 and then again to command buffer 0, 1, , , K−1,0,1 . . . . This results in processing the commands for transferring packets in the order in which the packets arrived. Each reading reads commands from start of a packet's commands until the end of the packet's commands. After moving along all the K command buffers, the out control returns to the first command buffer and starts reading the next packet. The out control (which transfers the packet, according to the commands) fetches commands in a cyclic manner, fetching the commands of a single packet at a time and moving to the next command buffer.

Many micro controllers whose tasks are processing packets with different packet sequence numbers may attempt to write to the command FIFO simultaneously. Some embodiments of the invention allow a micro controller to write to the correct command buffer within the command FIFO. In particular, a translation table that maps each of the tasks in the system with an exact lane and packet sequence number is used. The lane is used to access a port buffer, and the sequence number modulo K is used to access a command buffer in the port buffer.

Figure 7A:
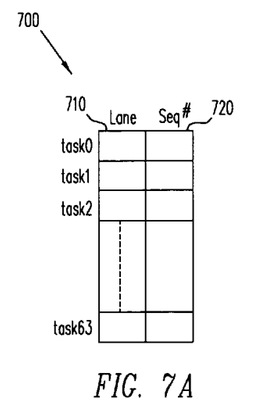
FIGS. 7A and 7B illustrate, in block diagrams, a translation table and its use in accordance with some embodiments of the invention.
Figure 7B:
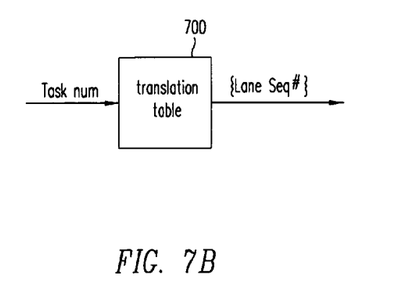

FIGS. 7A and 7B illustrate, in block diagrams, a translation table 700 and its use in accordance with some embodiments of the invention. In FIG. 7A, the translation table 700 has an entry for each task and stores the lane 710 and packet sequence number 720 for the task. Once the task is assigned to a packet, the translation table 700 is updated. As is illustrated in FIG. 7B, when a task number is available, the translation table 700 may be used to obtain the lane 710 and packet sequence number 720. Thus, the task number and translation table are used to obtain the lane and which packet sequence number are related to the access.

A command FIFO allows K different tasks to write concurrently to the command FIFO. Each command buffer allows one task to write commands. For example, if a task (belonging to a packet whose packet sequence number mod 2 is J) writes commands to the command FIFO, then, once the task has completed writing commands to the command buffer, the command buffer is released. The next task that is processing a packet whose packet sequence number mod 2 is J can start writing commands into the command buffer. Tasks belonging to packets whose command buffer is busy (i.e., another task assigned to a packet with the same modulo is writing to its associated command buffer) are suspended.

Figure 8:
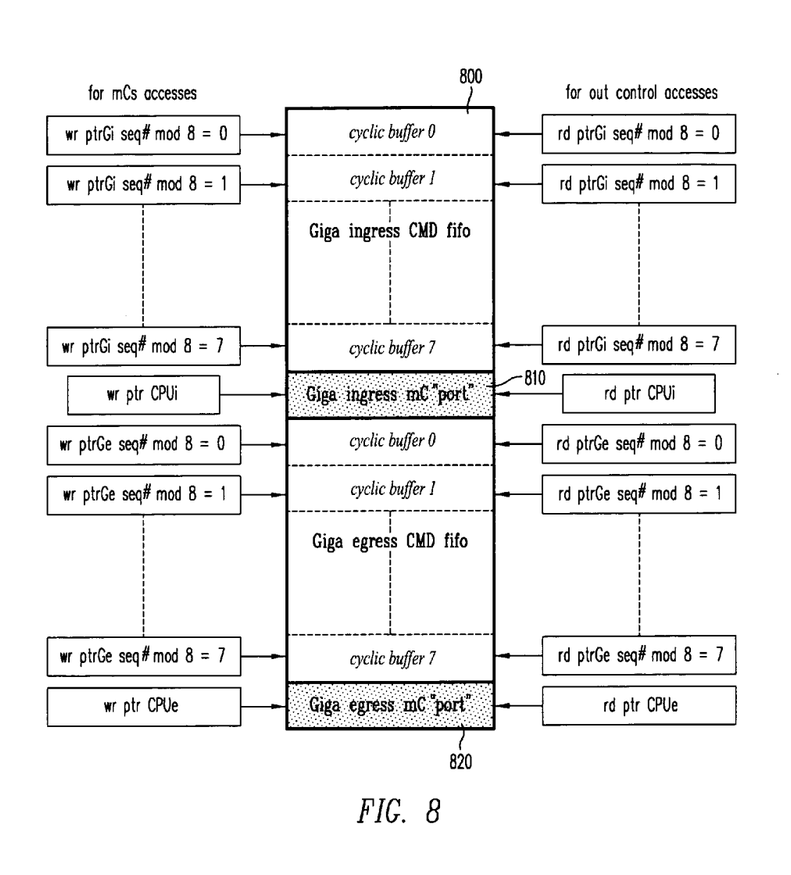
FIG. 8 illustrates, in a block diagram, a 1 gigabit Ethernet command FIFO in accordance with some embodiments of the invention.

FIG. 8 illustrates, in a block diagram, a 1 gigabit Ethernet command FIFO 800 in accordance with some embodiments of the invention. The 1 gigabit Ethernet command FIFO 800 is divided into an ingress micro controller port 810 (also referred to as "lane 810") and an egress micro controller port 820 (also referred to as "lane 820"). Each port buffer 810 and 820 is divided into 8 command buffers.

With the gigabit Ethernet FIFO, during normal operation, approximately 10 packets are assigned to be processed by different tasks on different micro controllers. If tasks are suspended because they try to write to the command FIFO prior to preceding packets, it is possible that tasks will be suspended frequently, resulting in only 1–2 active tasks (i.e., tasks writing to command buffers).

Therefore, the micro controllers are allowed to have 8 tasks for each direction (ingress and egress) write to the command FIFO simultaneously, without having to be suspended. Each command buffer is cyclically written and read. Each of the command buffers holds commands of a packet whose packet sequence number modulo 8 is M. The next command buffer serves a packet with packet sequence number K+1, and so on in a cyclic structure. Each command is identified by a packet sequence number and is targeted to a command buffer. If a packet's command buffer is not free, (e.g., a task with the same modulo 8 is writing to the modulo 8 command buffer), the task is suspended, until the modulo 8 command buffer is freed.

Figure 9:
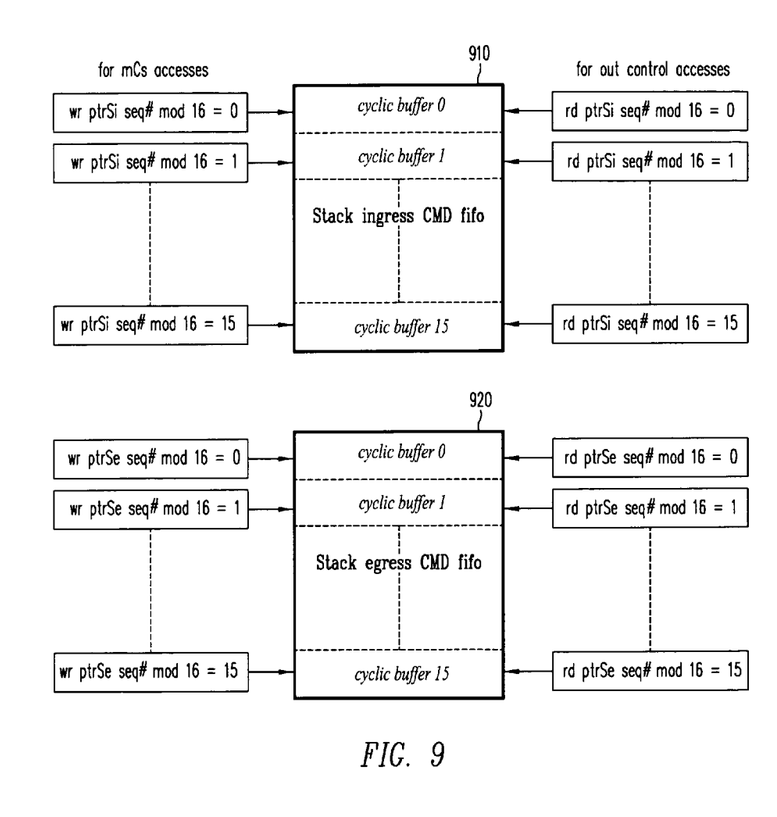
FIG. 9 illustrates, in a block diagram, a 2 gigabit stack Ethernet command FIFO in accordance with some embodiments of the invention.

FIG. 9 illustrates, in a block diagram, a 2 gigabit stack Ethernet command FIFO in accordance with some embodiments of the invention. The command FIFOs of ingress 910 and egress 920 are separated. Each of the command FIFOs 910 and 920 is divided into, for example, 16 command buffers.

In some embodiments, a task processing a short packet may make seven accesses to the command buffer to write commands. The size of the command buffer may be enough to hold 16 commands per packet.

Thus, although packets may not be processed by tasks in the order in which the packets were received, embodiments of the invention enable the packets to be sent out in their original order (i.e., the order in which they were received).

To summarize, in some embodiments of the invention, packets that are processed, lose their original order during their processing period. When transferred, the packets need to be sent out, in their original order. Packets are transferred according to commands issued during processing. The way the reordering is done is as follows:

Each lane includes K channel command buffers (M=0, . . . ,K−1) that hold the transfer commands, written in the processing period, per packet.

Each packet has a sequence# (e.g., a packet sequence number), which is used to redirect the writes of commands to the channel command buffer M according to the following rule: if sequence# modulo K is equal to M, then the writes will be sent to command buffer M.

The writes to each command buffer are being done in order, using a synchronization mechanism. The synchronization mechanism allows only one packet to write its commands to a command buffer.

If a packet with sequence# J is writing to command buffer M, then the synchronization will be between writes of packets with sequence numbers J, J+K, J+2K, etc.

Packet J+K is not allowed to write before packet J has completed writing all of its commands.

This mechanism allows tasks having K sequence numbers to write commands at the same time, since they are writing to different command buffers, making the write process efficient.

The reordering is now done according to the following mechanism:

The logic that transfers the packet, according to the commands, is fetching commands in a cyclic manner, and each time fetches the commands of a single packet and moves to the next command buffer (e.g., a single packet from command buffer 0, then 1, . . . , then K−1 and then again from command buffer 0, 1, , , , K−1,0,1, . . . etc). Thus, the packets are sent in their original order.

Pending application Ser. No. 09/102,972, entitled "Processing of Network Data by Parallel Processing Channels," by Eugene Opsasnick et al., filed Jun. 22, 1998 is incorporated by reference herein in its entirety.

Although the invention has been described with reference to particular embodiments, the description is only an example of the invention's application and should not be taken as a limitation.

Additionally, some embodiments of the invention may be tangibly embodied as software in a computer-readable device or media, such as memory, data storage devices, and/or data communication devices, thereby making a product or article of manufacture according to some embodiments of the invention. As such, the terms "article of manufacture" and "computer program product" and "computer-readable storage medium" as used herein are intended to encompass software accessible from any computer readable device or media. Using the present specification, some embodiments of the invention may be implemented as a machine, process, or article of manufacture by using programming and/or engineering techniques to produce software, firmware, hardware, or any combination thereof.

Various other adaptations and combinations of features of embodiments disclosed are within the scope of the invention as defined by the following claims.

I claim:

1. A computer readable storage medium encoded with software instructions to perform the following operations when executed by a computer:
   (1) receiving packets and assigning sequence numbers to the packets;
   (2) using each packet's sequence number to assign a command buffer to the packet so that each two packets with consecutive sequence numbers are assigned different command buffers;
   (3) writing commands for the packets to the packets' assigned command buffers, wherein the computer is operable to have at least two commands for at least two of the packets to be written to different command buffers simultaneously or not in an order in which the corresponding sequence numbers are assigned to the Rackets in the operation (1);
   (4) reading the commands from the command buffers and executing the commands to transfer the packets in an order in which the corresponding sequence numbers are assigned to the packets in the operation (1);
   (5) wherein if any command buffer C1 holds commands for at least two packets P1 and P2 with the packet P1 having an earlier assigned sequence number than the packet P2, and another command buffer holds a command for another packet P3 preceding P2 but not P1, then the operation (4) is performed for the packet P1, then for the packet P3, then for the packet P2.

2. A signal embedded in a carrier medium and encoded with software instructions to perform the following operations when executed by a computer:
   (1) receiving packets and assigning sequence numbers to the packets;
   (2) using each packet's sequence number to assign a command buffer to the packet so that each two packets with consecutive sequence numbers are assigned different command buffers;
   (3) writing commands for the packets to the packets' assigned command buffers, wherein the computer is operable to have at least two commands for at least two of the packets to be written to different command buffers simultaneously or not in an order in which the corresponding sequence numbers are assigned to the packets in the operation (1);
   (4) reading the commands from the command buffers and executing the commands to transfer the packets in an order in which the corresponding sequence numbers are assigned to the packets in the operation (1);
   (5) wherein if any command buffer C1 holds commands for at least two packets P1 and P2 with the packet P1 having an earlier assigned sequence number than the packet P2, and another command buffer holds a command for another packet P3 preceding P2 but not P1, then the operation (4) is performed for the packet P1, then for the packet P3, then for the packet P2.

3. A method for processing packets, the method comprising:
   (1) receiving the packets and assigning sequence numbers to the packets;
   (2) using the packets' sequence numbers to assign command buffers to the packets so that each two packets with consecutive sequence numbers are assigned respective two different command buffers;
   (3) writing commands for the packets to the packets' assigned command buffers, wherein at least two commands for at least two of the packets are written to different command buffers simultaneously or not in an order in which the corresponding sequence numbers are assigned to the packets in the operation (1);
   (4) reading the commands from the command buffers and executing the commands to transfer the packets in the order in which the corresponding sequence numbers are assigned to the packets in the operation (1);
   (5) wherein for at least one command buffer C1 which holds commands for at least two packets P1 and P2 with the packet P1 having an earlier assigned sequence number than the packet P2, the operation (4) is performed so as to transfer the packet P1, then a packet assigned another command buffer, then the packet P2.

4. The method of claim 3, wherein the command buffer is selected in the operation (2) based on a result of the packet sequence number modulo a number of said command buffers.

5. The method of claim 3, further comprising:
   determining whether the task may write commands into the selected command buffer based on whether a current sequence number of the command buffer matches a packet sequence number of the packet.

6. The method of claim 3 wherein for at least two packets P1 and P2 which are assigned a single command buffer C1, with the packet P1 having an earlier assigned sequence number than the packet P2, the operation (3) is suspended for the packet P2 until completion of the operation (3) for the packet P1.

7. The method of claim 3 wherein for any two packets P1 and P2 which are assigned a single command buffer C1, with the packet P1 having an earlier assigned sequence number than the packet P2, the operation (3) is not allowed to proceed for the packet P2 until completion of the operation (3) for the packet P1.

8. The method of claim 3 wherein the operation (4) is performed sequentially for different command buffers taken in an order in which the command buffers are assigned to packets in the operation (2).

9. The method of claim 3 wherein all of said packets are received on a single lane, the method further comprising:
   receiving packets for one or more other lanes, wherein each lane is associated with a plurality of command buffers; and
   performing the operations (1) through (5) for each lane and its associated plurality of the command buffers.

10. The method of claim 3 further comprising selecting and assigning a task for each packet, wherein the operation (3) is performed for each packet by the packet's assigned task executed by a processor.

11. The system of claim 10, further comprising a write pointer for each command buffer.

12. The system of claim 10, further comprising a read pointer for each command buffer.

13. The method of claim 3 wherein at least two of the commands are written to different command buffers simultaneously.

14. A method for processing packets, the method comprising:
- (1) sequentially receiving the packets in a first order;
- (2) assigning command buffers to the packets so that each two consecutive packets are assigned respective two different command buffers;
- (3) writing commands for the packets to the packets' assigned command buffers, wherein at least two commands for at least two of the packets are written to different command buffers simultaneously or not in an order in which the packets were received in the operation (1);
- (4) reading the commands from the command buffers and executing the commands to transfer the packets in the first order;
- (5) wherein for at least one command buffer C1 which holds commands for two packets P1 and P2 with the packet P1 preceding the packet P2 in the first order, the operation (4) is performed so as to transfer the packet P1, then a packet assigned another command buffer, then the packet P2.

15. The method of claim 14 wherein for at least two packets P1 and P2 which are assigned a single command buffer C1, with the packet P1 preceding the packet P2 in the first order, the operation (3) is suspended for the packet P2 before completion of the operation (3) for the packet P1.

16. The method of claim 14 wherein for any two packets P1 and P2 which are assigned a single command buffer C1, with the packet P1 preceding the packet P2 in the first order, the operation (3) is not allowed to proceed for the packet P2 until completion of the operation (3) for the packet P1.

17. The method of claim 14 wherein the operation (4) is performed sequentially on different command buffers taken in an order in which the command buffers are assigned to packets in the operation (2).

18. The method of claim 14 wherein all of said packets are received on a single lane, the method further comprising:
- receiving packets for one or more other lanes, wherein each lane is associated with a plurality of command buffers; and
- performing the operations (1) through (5) for each lane and its associated plurality of the command buffers.

19. The method of claim 14 further comprising selecting and assigning a task for each packet, wherein the operation (3) is performed for each packet by the packet's assigned task executed by a processor.

20. The method of claim 14 wherein at least two of the commands are written to different command buffers simultaneously.

21. A system comprising:
a plurality of command buffers; and
circuitry for:
- (1) receiving packets and assigning sequence numbers to the packets;
- (2) using each packet's sequence number to assign a command buffer to the packet so that each two packets with consecutive sequence numbers are assigned different command buffers;
- (3) writing commands for the packets to the packets' assigned command buffers, wherein the computer is operable to have at least two commands for at least two of the packets to be written to different command buffers simultaneously or not in an order in which the corresponding sequence numbers are assigned to the packets in the operation (1);
- (4) reading the commands from the command buffers and executing the commands to transfer the packets in an order in which the corresponding sequence numbers are assigned to the packets in the operation (1);
- (5) wherein if any command buffer C1 holds commands for at least two packets P1 and P2 with the packet P1 having an earlier assigned sequence number than the packet P2, and another command buffer holds a command for another packet P3 preceding P2 but not P1, then the operation (4) is performed for the packet P1, then for the packet P3, then for the packet P2.

22. A system comprising:
a plurality of command buffers; and
circuitry for:
- (1) sequentially receiving packets in a first order;
- (2) assigning command buffers to the packets so that each two consecutive packets are assigned different command buffers;
- (3) writing commands for the packets to the packets' assigned command buffers, wherein the computer is operable to have at least two commands for at least two of the packets to be written to different command buffers simultaneously or not in an order corresponding to the first order of the at least two packets;
- (4) reading the commands from the command buffers and executing the commands to transfer the packets in the first order;
- (5) wherein for at least one command buffer C1 which holds commands for two packets P1 and P2 with the packet P1 preceding the packet P2 in the first order, and another command buffer holds a command for another packet P3 preceding P2 but not P 1, the operation (4) is performed for the packet P1, then for the packet P3, then for the packet P2.

23. A computer readable storage medium encoded with software instructions to perform the following operations when executed by a computer:
- (1) sequentially receiving packets in a first order;
- (2) assigning command buffers to the packets so that each two consecutive packets are assigned different command buffers;
- (3) writing commands for the packets to the packets' assigned command buffers, wherein the computer is operable to have at least two commands for at least two of the packets to be written to different command buffers simultaneously or not in an order corresponding to the first order of the at least two packets;
- (4) reading the commands from the command buffers and executing the commands to transfer the packets in the first order;
- (5) wherein for at least one command buffer C1 which holds commands for two packets P1 and P2 with the packet P1 preceding the packet P2 in the first order, and another command buffer holds a command for another packet P3 preceding P2 but not P1, the operation (4) is performed for the packet P1, then for the packet P3, then for the packet P2.

24. A signal embedded in a carrier medium and encoded with software instructions to perform the following operations when executed by a computer:
- (1) sequentially receiving packets in a first order;
- (2) assigning command buffers to the packets so that each two consecutive packets are assigned different command buffers;
- (3) writing commands for the packets to the packets' assigned command buffers, wherein the computer is operable to have at least two commands for at least two of the packets to be written to different command buffers simultaneously or not in an order corresponding to the first order of the at least two packets;

(4) reading the commands from the command buffers and executing the commands to transfer the packets in the first order;

(5) wherein for at least one command buffer C1 which holds commands for two packets P1 and P2 with the packet P1 preceding the packet P2 in the first order, and another command buffer holds a command for another packet P3 preceding P2 but not P1, the operation (4) is performed for the packet P1, then for the packet P3, then for the packet P2.

* * * * *